United States Patent Office 3,041,342
Patented June 26, 1962

3,041,342
AMINO-PYRAZOLES
Ernst Jucker, Binningen, and Adolf J. Lindenmann and Erwin Rissi, Basel, Switzerland, assignors to Sandoz Ltd., Basel, Switzerland
No Drawing. Filed June 27, 1960, Ser. No. 38,769
Claims priority, application Switzerland July 3, 1959
10 Claims. (Cl. 260—293)

The present invention relates to a novel and useful—more especially therapeutically useful—group of amino-pyrazoles of the formula

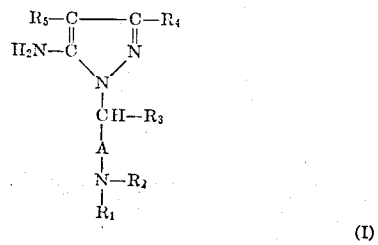

and the tautomers thereof, wherein $R_1$ and $R_2$ each stands for a lower alkyl group which may be straight-chained or branch-chained, A is a saturated alkylene group with at most two carbon atoms, $R_3$ stands for hydrogen or together with $R_2$ stands for an ethylene group, $R_4$ stands for a hydrogen atom or an alkyl, trihalogenmethyl, monocyclic aralkyl or monocyclic aryl group which may be substituted, and $R_5$ stands for a hydrogen atom or a lower alkyl group, a carbalkoxy or carboxy group, or a monocyclic aryl group which may be monosubstituted or polysubstituted by chlorine, fluorine or lower alkyl or alkoxy groups.

The new compounds I of the present invention are advantageously prepared by reacting an appropriate hydrazine of the formula

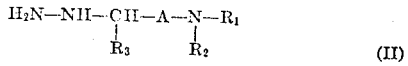

wherein $R_1$, $R_2$, $R_3$ and A have the precedingly-recited significances, either with an acyl-iminoester of the formula

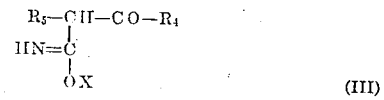

wherein $R_4$ and $R_5$ have the precedingly-recited significances, and X stands for a lower alkyl group. Alternatively, Compound II is condensed with and acylacetic acid nitrile of the formula

wherein $R_4$ and $R_5$ again have the precedingly-recited significances and, if desired, when $R_5$ is a carbalkoxy group, the product is saponified and decarboxylated.

In preparing the new amino-pyrazoles I of the present invention, which are substituted in the 1-position by a basic radical, the procedure—briefly stated—is advantageously the following: the mixture of hydrazine of Formula II, for example N-methyl-4-piperidyl-hydrazine or diethylamino-ethyl-hydrazine, and acyl-iminoester of Formula III, for example benzoylacetic acid-iminoethylester or α-ethyl-benzoyl-acetic acid-iminoethylester is allowed to stand at room temperature (about 20 to 30° C.); thereupon in order to assure completion of the reaction, the reaction mixture is preferably heated to 100–130° C. for one to two hours, after which the mixture is retained at this temperature for another 30 minutes or so under reduced pressure (e.g. at 20 mm. Hg), the resultant alcohol and water being thus removed. The end product of Formula I is then isolated from the reaction mixture according to any suitable and desirable method, and is purified.

The desired amino-pyrazoles of Formula I may also be obtained as follows: the solution of hydrazine derivative of Formula II, for example N-methyl-piperidyl-4-hydrazine, and of an acylacetic acid nitrile of Formula IV, for example α-(4-chlorophenyl)-acetoacetic acid nitrile, in an anhydrous organic solvent, e.g. absolute ethanol or glacial acetic acid, is stirred at room temperature and then, if desired, heated to boiling under reflux. After removing the solvent, the end product is isolated—e.g. by distillation in a high vacuum—and can be purified by crystallization.

Compounds of Formula I wherein $R_5$ is COOH can be obtained from compounds of Formula I wherein $R_5$ is COO.alkyl by subjecting the latter to alkaline saponification at elevated temperature in per se known manner. The 4-position unsubstituted pyrazoles can be prepared from the 4-carboxy-pyrazoles obtained by the saponification of the 4-carbalkoxy-pyrazoles, by splitting off carbon dioxide in a high vacuum.

The new amino-pyrazoles according to the present invention are crystalline or liquid at room temperature and can, for the most part, be distilled in a high vacuum without decomposition. They are basic compounds which form, with a wide variety of inorganic and organic acids, water-soluble salts which are crystalline at room temperature. Thus, for example, with hydrochloric, tartaric, acetic, phosphoric, oxalic, maleic, citric acids, etc., they form the corresponding hydrochlorides, tartrates, acetates, phosphates, oxalates, maleinates, citrates, etc.

The new amino-pyrazoles of the invention and their salts are highly suitable, on the basis of their pharmacodynamic properties, for a variety of therapeutic uses, since they have a wide spectrum of activity. Thus, while being of low toxicity, they have antiphlogistic, analgetic, antipyretic, adrenolytic, narcosis-potentiating, and temperature-reducing activities and, more especially, a specific anti-rheumatic activity. In addition, some of the compounds have a noteworthy serotonin-inhibiting activity.

Thus, for example, tests with respect to antiphlogistic (anti-inflammation) action, based on formalin oedema in the rat paw, give the following average results (Table I) as to inhibition of formalin oedema by subcutaneous administration of for example:

I. 1 - (N - isopropyl - piperidyl - 4') - 3 - methyl - 4 - phenyl-5-amino-pyrazole
II. 1 - (N - butyl - pyrrolidyl - 3') - 3 - methyl - 4 - phenyl-5-amino-pyrazole
III. 1 - (N - methyl - piperidyl - 4') - 3 - isopropyl - 4 - phenyl-5-amino-pyrazole

TABLE I

| Substance | Average Inhibition of Formalin Oedema in percent after— | | | | | |
|---|---|---|---|---|---|---|
| | 2 mg./kg. | 5 mg./kg. | 10 mg./kg. | 20 mg./kg. | 50 mg./kg. | 100 mg./kg. |
| I | —10.9 | —19.9 | —20.1 | —19.2 | —23.7 | —22.4 |
| II | | —12.1 | —19.3 | | | |
| III | | —7.6 | —23.6 | —21.2 | —21.5 | —21.9 |

In testing the analgetic activity by the hot plate test on mice, the average increase in reaction time 30 to 90 minutes after subcutaneous administration of 50 mg./kg. of test compound was 24% with 1-(N-methyl-piperidyl-4')-3-methyl-4-phenyl-5-amino-pyrazole (IV), and 45% with 1 - (N - methyl - piperidyl - 4') - 3 - n - butyl - 4 - phenyl-5-amino-pyrazole (V).

The antipyretic action on feverish rats is especially significant with 1-(N-isopropyl-piperidyl-4')-3-methyl-4-(4''-fluorophenyl)-5-amino-pyrazole (VI) and with 1-(N-methyl - piperidyl - 4') - 3 - trifluoromethyl - 4 - (4'' - fluorophenyl)-5-amino-pyrazole (VII), a dose of 2 to 5 mg./kg., intravenously administered bringing about a drop in temperature of at least 0.7° C.

The adrenolytic activity of e.g. 1-(N-methyl-piperidyl-4') - 3 - n - butyl - 4 - (4'' - chlorophenyl) - 5 - amino-pyrazole (VIII) on the isolated seminal vesicle of the guinea pig is only 6 times weaker than that of dihydroergotamine, the best known adrenolyticum.

A very good narcosis-potentiating action is exerted by 1 - (N - methyl - piperidyl - 4') - 3 - methyl - 4 - phenyl-5-amino-pyrazole (IV) which, upon subcutaneous injection of 41 mg./kg. in the mouse, in 50% of the cases enables a succeedingly administered subliminal pentothal dose to effect a narcosis lasting for at least two minutes.

As shown in Table II, in doses of 5 to 20 mg./kg. intravenously administered to feverish rats, the compound clearly lowers the rectal temperature.

TABLE II

*Average Drop in Rectal Temperature in the Feverish Rat 50–70 Minutes After Intravenous Administration of 1-(N-Methyl-Piperidyl-4') - 3-Methyl-4-Phenyl-5-Amino-Pyrazole (IV)*

| Dose | Average Drop in Temperature, °C |
|---|---|
| 20 mg./kg. | −3.2 |
| 10 mg./kg. | −2.6 |
| 5 mg./kg. | −0.8 |

The following Table III shows the inhibition of serotonin oedema in the rat paw after subcutaneous administration of 1-(N-methyl-piperidyl-4')-3-n-butyl-4-(4''-chlorophenyl)-5-amino-pyrazole (VIII):

TABLE III

| Substance | Inhibition of Serotonin Oedema after Subcutaneous Administration of — | | | | |
|---|---|---|---|---|---|
| | 0.1 mg./kg. | 0.2 mg./kg. | 1 mg./kg. | 10 mg./kg. | 50 mg./kg. |
| VIII, percent | −5.6 | −21.3 | −36.1 | −44.7 | −50.8 |

Since the new pyrazoles I are very easily convertible into water-soluble salts of inorgnaic and organic acids, there are thus made available for therapy pyrazole derivatives which are distinguished by very good resorbability and which can thus be administered per os, e.g. in the form of tablets. In addition, there is thus very simply made possible the preparation of highly concentrated solutions which in many cases are indispensable for parenteral "stoss" therapy. In addition, the new compounds I, prepared according to the present invention, are also useful as intermediates for the preparation of therapeutically useful products.

The compounds of Formula II, used as starting compounds in the instant invention, wherein $R_1$ is a lower alkyl group, $R_2$ and $R_3$ together represent an ethylene group, and A is a saturated alkylene group with at most two carbon atoms, can be prepared by condensing an N-alkyl-4-piperidone or an N-alkyl-3-pyrrolidone with a monoacyl-hydrazine, catalytically reducing the resultant acyl-hydrazone to the corresponding acylated hydrazine and splitting off the acyl group with an aqueous mineral acid at elevated temperature. Hydrazine derivatives of Formula II, wherein each of $R_1$ and $R_2$ is a lower alkyl group, $R_3$ stands for H, and A is as precedingly defined, can be prepared by condensing a dialkylaminoalkylhalide with an acyl-hydrazine to the corresponding acylated hydrazine and splitting off the acyl group with an aqueous mineral acid at elevated temperature.

The starting acylacetic acid nitriles of Formula IV, in so far as they may not already be known, can be prepared by known methods, for example by reacting a 4-position chlorinated or fluorinated benzyl cyanide with an ester of trifluoroacetic acid, phenylacetic acid, isobutyric or valeric acid in the presence of an alkaline condensing agent.

In the following examples, which set forth presently preferred illustrative embodiments of the invention, parts are by weight unless otherwise indicated. The relationship of parts by weight to parts by volume is as that of grams to milliliters. Temperatures are in degrees centigrade; melting points and boiling points are uncorrected.

EXAMPLE 1

A solution of 17.0 parts of α-ethoxy-methylene-cyanacetic acid-ethylester and 12.8 parts of N-methyl-piperidyl-4-hydrazine in 100 parts by volume of ethanol is heated to boiling under reflux for three hours. The solvent is then removed under reduced pressure, and the residue distilled in a high vacuum (0.008 mm. Hg) whereupon the produced 1-(N-methyl-piperidyl-4')-4-carbethoxy-5-amino-pyrazole distils over at between 165–166°, the so-obtained distillate solidifying in crystalline form on cooling. The compound:

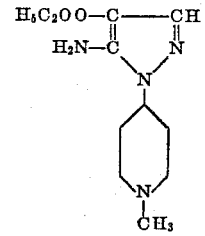

can be recrystallized from benzene-pertoleum ether, whereupon it melts at 125–126°.

The N-methyl-piperidyl-4-hydrazine is conveniently prepared as follows:

N-methyl-4-piperidone is converted to the benzoylhydrazone of N-methyl-4-piperidone by reaction with benzoylhydrazine. The benzoylhydrazone is then reduced to the corresponding benzoylhydrazine by hydrogenation in the presence of platinum oxide catalyst. Finally, the benzoyl group is split off by boiling the benzoylhydrazine with aqueous hydrochloric acid.

EXAMPLE 2

5.0 parts of 1-(N-methyl-piperidyl-4')-4-carbethoxy-5-amino-pyrazole in 50 parts by volume of aqueous 2-normal sodium hydroxide solution are heated to 120° under reflux for two hours. After the reaction mixture has cooled, concentrated hydrochloric acid is added thereto until a strong Congo-acid reaction is achieved, whereupon the mixture is concentrated under reduced pressure down to a small volume. Precipitated sodium chloride is then filtered off, the filtrate evaporated to dryness under reduced pressure, and the residue dried for a short time over phosphorus pentoxide and then recrystallized from ethanol. The so-obtained 1-(N-methyl-piperidyl-4')-4-carboxy-5-amino-pyrazole-dihydrochloride melts at 171–173°, with decomposition.

EXAMPLE 3

The 1 - (N-methyl-piperidyl-4') - 4-carboxy-5-amino-pyrazole-dihydrochloride obtained according to Example 2 is dried in a high vacuum at 110°, whereupon carbon dioxide splits off with the production of 1-(N-methyl-piperidyl-4')-5-amino-pyrazole-dihydrochloride which, on standing in air, immediately takes on 1 mol of water of crystallization.

To prepare the free base, the so-obtained dihydrochloride is suspended in chloroform and thoroughly shaken out with saturated aqueous sodium carbonate solution. After drying the chloroform solution over magnesium sulfate, the chloroform is removed under reduced pressure and the residue—1-(N-methyl-piperidyl-4′)-5-amino-pyrazole—recrystallized from benzene; M.P. 130–131°.

EXAMPLE 4

10.8 parts of α-ethoxy-methylene-cyanoacetic acid-ethylester are condensed, after the manner described in Example 1, with 11.0 parts of N-n-butyl-piperidyl-4-hydrazine in 100 parts by volume of ethanol. After removal of the solvent under reduced pressure, the residue is distilled at 0.05 mm. Hg, whereupon 1-(N-n-butyl-piperidyl-4′)-4-carbethoxy-5-amino-pyrazole distils at between 205–211°, the so-obtained distillate solidifying in crystalline form on cooling. M.P. 108–109° (from hexane).

The N-n-butyl-piperidyl-4-hydrazine is conveniently prepared after the manner described in the last paragraph of Example 1, except that the N-methyl-4-piperidone is replaced by N-n-butyl-4-piperidone.

EXAMPLE 5

The 1-(N-n-butyl-piperidyl-4′)-4-carbethoxy-5-amino-pyrazole obtained according to Example 4 is saponified and decarboxylated, after the manner described in Examples 2 and 3. The so-obtained 1-(N-n-butyl-piperidyl-4′)-5-amino-pyrazole-dihydrochloride melts, after being recrystallized from methanol-ether, at 135–138° (hygroscopic).

EXAMPLE 6

A mixture of 6.4 parts of benzoylacetic acid-imino-ethylester and 4.3 parts of N-methyl-piperidyl-4-hydrazine is heated to 100° for one hour, to 130° for one hour, and then maintained at the latter temperature at a pressure of 12 mm. Hg for a half hour. After cooling, the solidified reaction product—1-(N-methyl-piperidyl-4′)-3-phenyl-5-amino-pyrazole—is triturated with ether and then recrystallized from benzene-petroleum ether. M.P. 104–105°.

EXAMPLE 7

A mixture of 10.0 parts of α-methyl-benzoylacetic acid-imino-ethyl ester and 6.5 parts of N-methyl-piperidyl-4-hydrazine is allowed to stand for ½ hour at room temperature (about 20–30°), after which it is heated to 130° for two hours and then maintained at the latter temperature at a pressure of 12 mm. Hg for a half hour. After cooling, the reaction mixture is triturated with petroleum ether and recrystallized from ether-petroleum ether. The so-obtained product—1-(N-methyl-piperidyl-4′)-3-phenyl-4-methyl-5-amino-pyrazole—melts at 99°.

EXAMPLE 8

Starting from 8.9 parts of α-ethyl-benzoylacetic acid-imino-ethylester and 6.1 parts of N-methyl-piperidyl-4-hydrazine and following the procedure described in Example 7, the 1-(N-methyl-piperidyl-4′)-3-phenyl-4-ethyl-5-amino-pyrazole is prepared. M.P. 101–102° (from ether-petroleum ether).

EXAMPLE 9

Starting from 16.9 parts of α-n-propyl-benzoyl-acetic acid-imino-ethylester and 9.6 parts of N-methyl-piperidyl-4-hydrazine and following the procedure described in Example 7, the 1-(N-methyl-piperidyl-4′)-3-phenyl-4-n-propyl-5-amino-pyrazole is prepared. Boiling point of the crude product is 180–188°/0.2 mm. Hg; M.P. 87–88° (from ether-petroleum ether).

EXAMPLE 10

Starting from 8.3 parts of benzoylacetic acid-imino-ethylester and 5.8 parts of β-diethylamino-ethyl-hydrazine and following the procedure described in Example 7, the 1 - (1′ - diethylamino-ethyl-2′)-3-phenyl-5-amino-pyrazole:

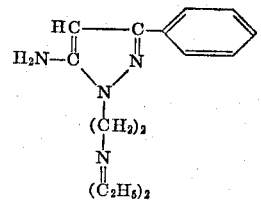

is prepared. The crude product boils at 180–190°/0.8 mm. Hg; it solidifies in crystalline form on cooling. M.P. 115° (from benzene).

The β-diethylamino-ethyl-hydrazine is conveniently prepared by reacting β-diethylamino-ethyl-chloride with acetyl-hydrazine to yield the 1-(β-diethylamino-ethyl)-2-acetyl-hydrazine, and then splitting off the acetyl group by refluxing with aqueous acetic acid.

EXAMPLE 11

A solution of 5.4 parts of N-methyl-pyrrolidyl-3-hydrazine and 7.5 parts of α-phenyl-acetoacetic acid-nitrile in 70 parts by volume of absolute ethanol is heated to boiling under reflux for 4 hours. The reaction mixture is thereupon evaporated to dryness under reduced pressure and then the residue is fractionated under a pressure of 0.04 mm. Hg, whereby the 1-(N-methyl-pyrrolidyl-3′)-3-methyl-4-phenyl-5-amino-pyrazole:

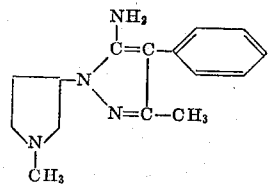

distils over at 165–173°, solidifying in crystalline form on cooling. After two recrystallizations from ether-petroleum ether, the compound melts at 100–102°.

The N-methyl-pyrrolidyl-3-hydrazine is conveniently prepared by reacting N-methyl-3-pyrrolidone with acetyl-hydrazine to yield the (N-methyl-3-pyrrolidyl)-acetyl-hydrazone which is then reduced to the (N-methyl-3-pyrrolidyl)-2-acetyl-hydrazine with catalytic hydrogen, after which the acetyl group is split off with the aid of aqueous hydrochloric acid.

EXAMPLE 12

Following the procedure described in Example 11, the compound 1-(N-ethyl-pyrrolidyl-3′)-3-methyl-4-phenyl-5-amino-pyrazole is obtained by the condensation of 5.6 parts of N-ethyl-pyrrolidyl-3-hydrazine and 6.9 parts of α-phenylacetoacetic acid-nitrile in 70 parts by volume of absolute ethanol. The new compound boils at 163–166°/0.07 mm. Hg, the so-obtained distillate solidifying in crystalline form on cooling. The pure substance melts at 100–103° after two recrystallizations from ether-petroleum ether.

EXAMPLE 13

Following the procedure described in Example 11, the compound 1-(N-isopropyl-pyrrolidyl - 3′) - 3 - methyl - 4-phenyl-5-amino-pyrazole is obtained by the condensation of 6.8 parts of N-isopropyl-pyrrolidyl-3-hydrazine and 7.6 parts of α-phenyl-acetoacetic acid-nitrile in 70 parts by volume of absolute ethanol. The new compound boils at 180–188°/0.02 mm. Hg, the so-obtained distillate solidifying in crystalline form in the cooler-condenser. The pure substance melts at 117–120° after two recrystallizations from ether-petroleum ether.

EXAMPLE 14

A solution of 14.8 parts of N-n-butyl-pyrrolidyl-3-hydrazine and 15.0 parts of α-phenyl-acetoacetic acid-nitrile in 200 parts by volume of absolute ethanol is heated to boiling under reflux for 4 hours. The reaction mixture is thereupon evaporated to dryness under reduced pressure at 55°, and the residue distilled in a high vacuum. After separation of a preliminary distillate, the distillation residue is allowed to cool and is then recrystallized three times from ether-petroleum ether. The obtained pure 1-(N-n-butyl)-pyrrolidyl-3')-3-methyl-4 - phenyl - 5-amino-pyrazole melts without decomposition at 109–111°.

EXAMPLE 15

A solution of 31.8 parts of $\alpha$-phenyl-acetoacetic acid-nitrile and 25.8 parts of N-methyl-piperidyl-4-hydrazine in 200 parts by volume of absolute ethanol is allowed to stand at room temperature for one hour, after which it is heated to boiling under reflux for two hours. The ethanol is then distilled off under reduced pressure, and the so-obtained oily residue is fractionated under a pressure of 0.05 mm. Hg, whereupon the produced 1-(N-methyl-piperidyl-4')-3-methyl-4-phenyl-5-amino - pyrazole distils over at between 168–181°. The compound can be recrystallized from methanol. On standing in air, it takes on water of crystallization, whereupon it melts at 141–143°.

By adding to a methanolic solution of 1-(N-methyl-piperidyl-4')-3-methyl-4-phenyl - 5 - amino - pyrazole, an equivalent quantity of a methanolic solution of hydrochloric acid, oxalic acid, D-tartaric acid or maleic acid, the corresponding salts are obtained; after working up in conventional manner these salts are obtained in crystalline form:

Dihydrochloride, M.P. 281–284° (decomposition) from methanol-ether;
Oxalate, M.P. 134–137° (decomposition) from methanol-ether (hygroscopic);
Tartrate, M.P. 209–211° (decomposition) from methanol;
Bis-maleinate, M.P. 144–146° from methanol-ether.

EXAMPLE 16

10.4 parts of $\alpha$-phenyl-acetoacetic acid-nitrile is condensed, after the manner described in Example 15, with 11.3 parts of N-n-butyl-piperidyl-4-hydrazine in 70 parts by volume of absolute ethanol. After removal of the solvent, the reaction product is distilled in a high vacuum (pressure of 0.05 mm. Hg), whereupon 1-(N-n-butyl-piperidyl-4')-3-methyl-4-phenyl-5-amino - pyrazole passes over at between 180–200° at the said pressure, this distillate solidifying into a hard mass upon being cooled. The said pyrazole derivative crystallizes upon being triturated with methanol and melts at 109–111° after two recrystallizations from absolute methanol.

EXAMPLE 17

A solution of 7.8 parts of $\alpha$-(4-chloro-phenyl)-acetoacetic acid nitrile and 5.2 parts of N-methyl-piperidyl-4-hydrazine in 45 parts by volume of absolute ethanol is allowed to stand at room temperature for one hour, after which it is heated to boiling under reflux for two hours. The ethanol is then distilled off, and the so-obtained residue fractionated under a pressure of 0.1 mm. Hg. The fraction (6.4 parts) passing over betweeen 166–174° under the said pressure is crystallized from ethyl acetate. By further fractional distillation from ethyl acetate, the so-obtained 1-(N-methyl-piperidyl-4')-3-methyl - 4 - (4''-chloro-phenyl)-5-amino-pyrazole which melts at 111–113° can be separated in pure state from the 1-(N-methyl-piperidyl-4')-2-acetyl-hydrazine which is concomitantly produced as a by-product.

EXAMPLE 18

Following the procedure described in Example 15, 5.8 parts of $\beta$-diethylamino-ethylhydrazine are condensed with 7.0 parts of $\alpha$-phenyl-acetoacetic acid-nitrile in 40 parts by volume of absolute ethanol. The resultant reaction product is freed of solvent by evaporation, after which the residue is distilled under a pressure of 0.9 mm. Hg, whereupon the 1-(1'-diethylaminoethyl-2')-3-methyl-4-phenyl-5-amino-pyrazole distils over at an air-bath temperature of 155–170°. Repeated distillation gives a boiling point of 160–164°/0.8 mm. Hg.

By the addition of an equivalent quantity of a methanolic oxalic acid solution to a solution of the pyrazole derivative in methanol, the acid oxalate which crystallizes with two mols of water of crystallization and melts at 126–127° is obtained.

EXAMPLE 19

Following the procedure described in Example 15, 9.5 parts of $\alpha$-(4-methoxy-phenyl)-acetoacetic acid-nitrile are condensed with 6.5 parts of N-methyl-piperidyl-4-hydrazine in 70 parts by volume of absolute ethanol. After removal of the solvent therefrom, the reaction product is distilled under a pressure of 0.05 mm. Hg, whereupon the 1-(N - methyl - piperidyl - 4')-3 - methyl-4-(4''-methoxy-phenyl)-5-amino-pyrazole distils over at between 151 and 160°. This distillate crystallizes upon trituration with ethyl acetate and, after two recrystallizations from this same solvent, melts at 109–111°. Upon standing in air, the compound immediately takes on 1 mol of water of crystallization.

EXAMPLE 20

Following the procedure described in Example 15, 4.3 parts of $\alpha$-phenyl-acetoacetic acid-nitrile are condensed with 4.2 parts of N-isopropyl-piperidyl-4-hydrazine in 30 parts by volume of absolute ethanol. After removal of the solvent therefrom, the reaction product is distilled under a pressure of 0.01 mm. Hg, whereupon the 1-(N-isopropyl-piperidyl-4')-3-methyl-4-phenyl-5-amino - pyrazole distils over at between 152 and 160°, the so-obtained distillate solidifying in crystalline form on cooling. After two recrystallizations from hexane, the compound melts at 109–111°.

EXAMPLE 21

Following the procedure described in Example 15, 3.6 parts of $\alpha$-formyl-benzylcyanide are condensed with 3.0 parts of N-methyl-piperidyl-4-hydrazine in 30 parts by volume of absolute ethanol. After removal of the solvent, the crystalline residue—1-(N-methyl-piperidyl-4')-4-phenyl-5-amino-pyrazole—is recrystallized twice from ethyl acetate. M.P. 140–141°.

EXAMPLE 22

A solution of 5.7 parts of N-methyl-piperidyl-4-hydrazine in 5 parts by volume of glacial acetic acid is stirred dropwise into a solution of 7.6 parts of $\alpha$-propionyl-benzylcyanide in 15 parts by volume of glacial acetic acid, care being taken that the temperature of the reaction mixture does not exceed 55°. The reaction mixture is then stirred for a further hour at room temperature, after which the glacial acetic acid is distilled off at 40–50° under reduced pressure. The residue from the distillation is taken up in a small quantity of water, the aqueous solution rendered alkaline by saturation with sodium carbonate and then shaken out with a total of 250 parts by volume of benzene. After drying the benzene extract over magnesium sulfate, the benzene is removed under reduced pressure and the residue distilled under a pressure of 0.03 mm. Hg, whereupon the 1-(N-methyl-piperidyl-4')-3-ethyl-4-phenyl-5-amino-pyrazole distils over at 185–193°, the so-obtained distillate solidifying in crystalline form on cooling. After two recrystallizations from toluene-petroleum ether, the compound melts at 91–93°.

EXAMPLE 23

7.5 parts of $\alpha$-isobutyryl-benzylcyanide are condensed with 5.2 parts of N-methyl-piperidyl-4-hydrazine in 20 parts by volume of glacial acetic acid, the further procedure being as described in Example 22 through the removal of the benzene. After removal of the benzene (as in the latter example), the residue is distilled under a pressure of 0.1 mm. Hg, whereupon the 1-(N-methyl-piperidyl - 4')-3 - isopropyl - 4 - phenyl-5-amino-pyrazole passes over between 150 and 155° as a yellow oil which solidifies into a crystalline mass when cooled. After recrystallization from toluene and toluene-petroleum ether, the new amino-pyrazole derivative melts at 123–125°.

EXAMPLE 24

10.0 parts of α-valeroyl-benzylcyanide are condensed with 6.5 parts of N-methyl-piperidyl-4-hydrazine in 25 parts by volume of glacial acetic acid, the further procedure being as described in Example 22 through the removal of the benzene. After removal of the benzene, the residue is distilled under a pressure of 0.1 mm. Hg, whereupon the 1-(N-methyl-piperidyl-4')-3-n-butyl-4-phenyl-5-amino-pyrazole distils over between 165 and 170° as a viscous yellow oil. The compound is taken up in water-saturated toluene, whereupon the new 5-amino-pyrazole derivative separates out as the crystalline hydrate. After recrystallization from benzene-petroleum ether, the hydrate melts at 105–107°.

EXAMPLE 25

A solution of 6.5 parts of N-methyl-piperidyl-4-hydrazine in 5 parts by volume of glacial acetic acid is stirred dropwise into a solution of 11.8 parts of α-valeroyl-4-chloro-benzylcyanide in 25 parts by volume of glacial acetic acid, care being taken that the temperature of the reaction mixture does not exceed 55°. Stirring of the reaction mixture is then continued for two more hours at room temperature, after which the glacial acetic acid is distilled off at 40–50° under reduced pressure. The residue from this distillation is taken up in 100 parts by volume of water, the aqueous solution rendered alkaline by saturation thereof with sodium carbonate and then extracted with a total of 350 parts by volume of benzene. After drying the extract over magnesium sulfate, the benzene is removed under reduced pressure, and the residue fractionated under a pressure of 0.05 mm. Hg, whereupon 1 - (N - methyl-piperidyl-4')-3-n-butyl-4-(4''-chloro-phenyl)-5-amino-pyrazole distils over between 195 and 205° as a thickly viscous yellow oil which solidifies as a glass-like solid upon cooling. After recrystallization from hexane, the new amino-pyrazole derivative melts at 93–95°.

EXAMPLE 26

15.0 parts of α-butyryl-benzylcyanide are condensed with 10.4 parts of N-methyl-piperidyl-4-hydrazine in 40 parts by volume of glacial acetic acid, the further procedure being as described in Example 22 through the removal of the benzene. After the removal of the benzene, the residue is distilled under a pressure of 0.03 mm. Hg, whereupon 1-(N-methyl-piperidyl-4')-3-n-propyl-4-phenyl-5-amino-pyrazole passes over between 170 and 181° as a thickly viscous yellowish oil which solidifies in crystalline form upon cooling. M.P. 78–79° (from ethylacetate-petroleum ether).

EXAMPLE 27

8.9 parts of α-(4-fluoro-phenyl)-acetoacetic acid nitrile are condensed with 6.5 parts of N-methyl-piperidyl-4-hydrazine in 27 parts by volume of glacial acetic acid, the further procedure being as described in Example 22 through the removal of the benzene. After the removal of the benzene, the residue is distilled under a pressure of 0.05 mm. Hg, whereupon 1-(N-methyl-piperidyl-4')-3-methyl-4-(4''-fluoro-phenyl)-5-amino-pyrazole goes over at between 180 and 183° as a thickly viscous yellowish oil which solidifies to a hard mass upon cooling. After two recrystallizations from benzene, the new amino-pyrazole derivative melts at 117–119°.

EXAMPLE 28

9.4 parts of α-(phenyl-acetyl)-benzycyanide are condensed wtih 5.6 parts of N-methyl-piperidyl-4-hydrazine in 33 parts by volume of glacial acetic acid, the further procedure being as described in Example 22 through the removal of the benzene. After the removal of the benzene, the residue is distilled under a pressure of 0.1 mm. Hg, whereupon 1-(N-methyl - piperidyl-4')-3-benzyl-4-phenyl-5-amino-pyrazole distils over at 201–210°, the so-obtained distillate solidfying to a glass-like mass upon cooling.

Upon addition to an ethanolic solution of the said pyrazole base of the calculated quantity of an ethanolic solution of maleinic (maleic) acid in the mol proportion of 1:2, followed by the addition of ether, the crystalline maleinate (maleate) separates out. M.P. 144–145° after two recrystallizations from ethanol.

EXAMPLE 29

5.4 parts of α-(phenyl-acetyl)-4-chloro-benzyl-cyanide are condensed with 2.6 parts of N-methyl-piperidyl-4-hydrazine in 123 parts by volume of glacial acetic acid, the further procedure being as described in Example 22 through the removal of the benzene. After the removal of the benzene, the residue is distilled under a pressure of 0.06 mm. Hg, whereupon 1-(N-methyl-piperidyl-4')-3-benzyl-4(4''-chloro-phenyl)-5-amino-pyrazole distils over at between 190 and 210°.

Upon addition of an ethanolic solution of maleic acid to an ethanolic solution of the so-obtained pyrazole base in the mol proportion of 1:2, the bis-maleate is formed. The salt crystallizes out on the addition of ether and, after two recrystallizations from ethanol-ether, melts at 108–110°.

EXAMPLE 30

By following the procedure described in Example 22, the 1-(N-methyl-piperidyl-4') - 3 - n - butyl-4-(4''-fluoro-phenyl)-5-amino-pyrazole is prepared from 11.0 parts of α-valeroyl-4-fluoro-benzylcyanide and 6.45 parts of N-methyl-piperidyl-4-hydrazine in 58 parts by volume of glacial acetic acid. Boiling point of the crude product: 160–180°/0.03 mm. Hg (thickly viscous yellow oil). Upon trituration with benzene, the new amino-pyrazole derivative crystallizes out; M.P. 82–84°.

The α-valeroyl-4-fluoro-benzylcyanide (B.P. 138–141°/0.1 mm. Hg) can be prepared by reacting 4-fluoro-benzylcyanide with ethyl valerianate in ethanol in the presence of sodium ethylate.

EXAMPLE 31

A solution of 5.2 parts of N-methyl-piperidyl-4-hydrazine in 4 parts by volume of glacial acetic acid is stirred dropwise into a solution, at 40°, of 6.2 parts of α-phenyl-acetoacetic acid-nitrile in 10 parts by volume of glacial acetic acid, care being taken that the temperature of the reaction mixture does not rise above 55°. The reaction mixture is then stirred for another hour at room temperature, after which the glacial acetic acid is distilled off at 40° under reduced pressure. The so-obtained residue is taken up in a small quantity of water, the aqueous solution then rendered alkaline by saturating it with sodium carbonate, after which the solution is shaken out with chloroform. After drying the chloroform extract over magnesium sulfate, the chloroform is removed under reduced pressure, the residue—1-(N-methyl-piperidyl-4')-3-methyl - 4-phenyl-5-amino-pyrazole—recrystallized from benzene and then from methanol. After it has taken on 1 mol of water of crystallization, the compound melts at 141–142°.

EXAMPLE 32

7.2 parts of α-(4-fluoro-phenyl)-acetoacetic acid-nitrile are condensed with 6.4 parts of N-isopropyl-piperidyl-4-hydrazine in 22 parts by volume of glacial acetic acid, the further procedure being as disclosed in Example 31 up to the removal of the glacial acetic acid. The latter is removed at 40–50° under reduced pressure, and the residue then taken up in 120 parts by volume of water, the aqueous solution then rendered alkaline by saturating it with sodium carbonate, after which the solution is shaken out with a total of 220 parts by volume of benzene. After drying the extract over magnesium sulfate, the benzene is removed under reduced pressure and the obtained crystalline residue—1-(N - isopropyl - piperidyl-4')-3-methyl-4-(4" - fluoro - phenyl)-5-amino-pyrazole — recrystallized twice from benzene-petroleum ether; M.P. 120–122°.

EXAMPLE 33

12.1 parts of α-(4-chloro-phenyl)-acetoacetic acid-nitrile are condensed with 9.8 parts of N-isopropyl-piperidyl-4-hydrazine in 47 parts by volume of glacial acetic acid, the further procedure being as described in Example 32. The obtained product—1-(N-isopropyl-piperidyl-4')-3-methyl-4-(4"-chloro-phenyl)-5-amino-pyrazole—melts at 128–130° after recrystallization from benzene.

EXAMPLE 34

5.1 parts of α-(phenyl-acetyl)-4-fluoro-benzylcyanide are condensed with 2.6 parts of N-methyl-piperidyl-4-hydrazine in 78 parts by volume of glacial acetic acid, the further procedure being as described in Example 32. The obtained product—1-(N-methyl-piperidyl-4')-3-benzyl-4-(4"-fluoro-phenyl)-5-amino-pyrazole—melts at 125–127° after recrystallization from benzene.

The α-(phenyl-acetyl)-4-fluoro-benzylcyanide (M.P. 105–107°) can be prepared by reacting 4-fluoro-benzylcyanide with phenylacetic acid ethylester in ethanol in the presence of sodium ethylate.

EXAMPLE 35

A solution of 5.2 parts of N-methyl-piperidyl-4-hydrazine in 5 parts by volume of glacial acetic acid is stirred dropwise into a solution of 8.8 parts of α-benzoylbenzylcyanide in 15 parts by volume of glacial acetic acid, care being taken that the temperature of the reaction mixture does not exceed 55°. The reaction mixture is then stirred for another hour at room temperature, after which the glacial acetic acid is distilled off at about 50° under reduced pressure. The residue from the distillation is taken up in 100 parts by volume of water, the aqueous solution rendered alkaline by saturation with sodium carbonate and then shaken out with a total of 230 parts by volume of benzene. After drying the extract over magnesium sulfate, the benzene is distilled off under reduced pressure and the obtained solid residue is recrystallized from benzene. M.P. 108–110° The product is then chromatographed over aluminum oxide, 1-(N-methyl-piperidyl-4')-3,4-diphenyl-5-amino-pyrazole being eluted with a solvent mixture of benzene and chloroform (1:4). After further recrystallization from benzene-petroleum ether, the new amino-pyrazole derivative melts at 162–164°.

EXAMPLE 36

A solution of 5.2 parts of N-mthyl-piperidyl-4-hydrazine in 5 parts by voulme of glacial acetic acid is stirred dropwise into a solution of 8.9 parts of α-isobutyryl-4-chloro-benzylcyanide in 20 parts by volume of glacial acetic acid, care being taken to prevent the temperature from rising above 55°. Stirring of the reaction mixture is thereupon continued for 2 more hours at room temperature, after which the glacial acetic acid is distilled off at 40–45° under reduced pressure. The residue is taken up in 120 parts by volume of water, the aqueous solution rendered alkaline by saturating with sodium carbonate, after which it is extracted with a total of 350 parts by volume of benzene. After drying the extract over magnesium sulfate, the benzene is in part distilled off under reduced pressure, whereupon a crystalline separation takes place. The crystalline material is filtered off, the filtrate is evaporated to dryness under reduced pressure and the obtained semi-crystalline residue is purified over aluminum oxide. After recrystallization from benzene-petroleum ether, the so-obtained 1-(N-methyl-piperidyl-4')-3-isopropyl-4-(4"-chloro-phenyl)-5-amino-pyrazole melts at 119–120°.

The α-isobutyryl-4-chloro-benzylcyanide can be prepared by reacting 4-chloro-benzylcyanide with isobutyric acid ethylester in ethanol in the presence of sodium ethylate; M.P. 64–65° after recrystallization from benzene-petroleum ether.

EXAMPLE 37

A solution of 6.5 parts of N-methyl-piperidyl-4-hydrazine in 7 parts by volume of glacial acetic acid is stirred dropwise into a solution of 11.6 parts of α-trifluoroacetyl-4-fluoro-benzylcyanide in 25 parts by volume of glacial acetic acid, care being taken to keep the temperature from exceeding 45°. The reaction mixture is then further stirred for an hour at room temperature, after which the glacial acetic acid is distilled off at 40–50° under reduced pressure. The residue from this distillation is taken up in 200 parts by volume of water, the aqueous solution rendered alkaline by and saturated with sodium carbonate and then extracted with a total of 300 parts by volume of benzene. After drying the extract over magnesium sulfate, the benzene is removed and the residue is fractionated under a pressure of 0.08 mm. Hg, 1-(N-methyl-piperidyl-4')-3-trifluoromethyl-4 - (4" - fluoro-phenyl)-5-amino-pyrazole going over between 181 and 190° as a thickly viscous yellowish oil which hardens to a glass-like mass upon cooling.

To prepare the hydrochloride of the thus-obtained new amino-pyrazole derivative, the latter is dissolved in excess aqueous 2-normal hydrochloric acid and the solution then evaporated to dryness. After two recrystallizations of the residue from ethanol, the obtained 1-(N-methyl-piperidyl-4') - 3 - trifluoromethyl-4-(4"-fluoro-phenyl)-5-aminopyrazole-hydrochloride melts at 241–243°.

The α-trifluoroacetyl-4-fluoro-benzylcyanide can be prepared by reacting 4-fluoro-benzylcyanide with trifluoroacetic acid ethylester in ethanol in the presence of sodium ethylate. B.P. 98–100°/0.08 mm. Hg; M.P. 73–75°.

EXAMPLE 38

Following the procedure set forth in Example 37, 1-(N-n-butyl-piperidyl-4')-3-trifluoromethyl - 4 - phenyl-5-amino-pyrazole is obtained from 3.11 parts of α-phenyl-trifluoroacetoacetic acid-nitrile and 2.5 parts of N-n-butyl-piperidyl-4-hydrazine in 13 parts by volume of glacial acetic acid. Boiling point of the crude amino-pyrazole derivative: 189–191°/0.03 mm. Hg (viscous, dark yellow oil). Crystallized and recrystallized from benzene-petroleum ether: M.P. 79–81°.

EXAMPLE 39

A solution of 11.65 parts of N-methyl-piperidyl-4-hydrazine in 15 parts by volume of glacial acetic acid is stirred dropwise into a solution of 16.8 parts of α-phenyl-trifluoroacetoacetic acid-nitrile in 35 parts by volume of glacial acetic acid, care being taken that the reaction temperature does not exceed 55°. Stirring of the reaction mixture is continued for two more hours at room temperature, after which the glacial acetic acid is distilled off at 40–50° under reduced pressure. The residue is taken up in 150 parts by volume of water, the aqueous solution rendered alkaline by and saturated with sodium carbonate and then extracted with a total of 450 parts by volume of benzene. After drying the extract over magnesium sulfate, the benzene is removed by distillation under reduced pressure and the resultant crystalline residue recrystallized from ethyl acetate. The so-obtained 1-(N-methyl-piperidyl-4')-3-trifluoromethyl - 4-phenyl-5-amino-pyrazole melts at 108–109°.

EXAMPLE 40

A solution of 4.3 parts of N-methyl-piperidyl-4-hydrazine in 5 parts by volume of glacial acetic acid is stirred dropwise into a solution of 8.2 parts of α-trifluoroacetyl-4-chloro-benzylcyanide in 20 parts by volume of glacial acetic acid, care being taken that the reaction temperature does not exceed 45°. Stirring of the reaction mixture is then continued for two more hours at room temperature, after which the glacial acetic acid is distilled off at 40–50° under reduced pressure. The residue is taken up in 80 parts by volume of water, the aqueous solution rendered alkaline by and saturated with sodium carbonate, after which it is shaken out with a total of 300 parts by volume of benzene. After drying the extract over magnesium sulfate, the benzene is removed under reduced pressure and the residue is chromatographed on aluminum oxide, 1-(N-methyl-piperidyl-4′)-3-trifluoro-methyl-4-(4″-chloro-phenyl)-5-amino-pyrazole being eluted with a solvent mixture of benzene and chloroform (1:1). After recrystallization from benzene-petroleum ether, the new 5-amino-pyrazole derivative melts at 106–108°.

The α-trifluoroacetyl-4-chloro-benzylcyanide (B.P. 124–126°/0.1 mm. Hg) can be prepared by reacting 4-chloro-benzylcyanide with trifluoroacetic acid ethylester in ethanol in the presence of sodium ethylate.

EXAMPLE 41

A solution of 6.5 parts of N-methyl-piperidyl-4-hydrazine in 6 parts by volume of glacial acetic acid is stirred dropwise into a solution of 8.7 parts of α-acetyl-4-methyl-benzylcyanide in 50 parts by volume of glacial acetic acid, care being taken that the reaction temperature does not exceed 50°. The reaction mixture is then further stirred for two hours at room temperature, after which the glacial acetic acid is distilled off at 40–50° under reduced pressure. The residue is taken up in 100 parts by volume of water, washed with a total of 50 parts by volume of ether, the aqueous solution rendered alkaline by and saturated with sodium carbonate, after which it is extracted with a total of 250 parts by volume of benzene. After drying the extract over magnesium sulfate, the benzene is removed under reduced pressure and the residue — 1-(N-methyl-piperidyl-4′)-3-methyl-4-(4″-tolyl)-5-amino-pyrazole — crystallized from benzene-petroleum ether. After recrystallization from ethanol-water, the new 5-amino-pyrazole derivative crystallizes with 1 mol of water of crystallization and melts at 105–107°.

EXAMPLE 42

A solution of 3.3 parts of N-methyl-piperidyl-4-hydrazine in 4 parts by volume of glacial acetic acid is stirred dropwise into a solution of 6.3 parts of α-hexanoyl-4-chloro-benzylcyanide in 30 parts by volume of glacial acetic acid, care being taken that the temperature does not exceed 50°. The reaction mixture is then stirred for two more hours at room temperature, after which the glacial acetic acid is distilled off at 40–50° under reduced presure. The residue is taken up in 100 parts by volume of water, washed with a total of 50 parts by volume of ether, the aqueous solution rendered alkaline by and saturated with sodium carbonate and then extracted with a total of 250 parts by volume of benzene. After drying the extract over magnesium sulfate, the benzene is removed under reduced pressure, and the oily residue — 1-(N-methyl-piperidyl-4′)-3-n-pentyl-4-(4″-chloro-phenyl)-5-amino-pyrazole — crystallized from benzene-petroleum ether. After recrystallization from wet benzene or from ethanol-water, the new 5-amino-pyrazole derivative crystallizes with 1 mol of water of crystallization and melts at 110–111°.

EXAMPLE 43

A solution of 3.3 parts of N-methyl-piperidyl-4-hydrazine in 4 parts by volume of glacial acetic acid is stirred dropwise into a solution of 6.7 parts of α-n-heptanoyl-4-chloro-benzylcyanide in 30 parts by volume of glacial acetic acid, care being taken that the reaction temperature does not exceed 50°. The reaction mixture is then further stirred for two hours at room temperature, after which the glacial acetic acid is distilled off at 40–50° under reduced pressure. The residue is taken up in 100 parts by volume of water, washed with a total of 50 parts by volume of ether, the aqueous solution rendered alkaline by and saturated with sodium carbonate and then extracted with a total of 250 parts by volume of chloroform. After drying the extract over magnesium sulfate, the chloroform is removed under reduced pressure and the oily residue — 1-(N-methyl-piperidyl-4′)-3-n-hexyl-4-(4″-chloro-phenyl)-5-amino-pyrazole — crystallized from ethanol-water and then twice recrystallized from the same solvent mixture. The new 5-amino-pyrazole derivative contains 1 mol of water of crystallization and melts at 101–103°.

EXAMPLE 44

A solution of 9.8 parts of N-methyl-piperidyl-4-hydrazine in 10 parts by volume of glacial acetic acid is stirred dropwise into a solution of 21.8 parts of α-nonanoyl-4-chloro-benzylcyanide in 70 parts by volume of glacial acetic acid, care being taken that the reaction temperature does not exceed 50°. The reaction mixture is then stirred for two more hours at room temperature, after which the glacial acetic acid is distilled off at 40–50° under reduced pressure. The residue is taken up in 200 parts by volume of water, washed with a total of 100 parts by volume of ether, the aqueous solution rendered alkaline by and saturated with sodium carbonate and then extracted with a total of 400 parts by volume of chloroform. After drying the extract over magnesium sulfate, the chloroform is removed under reduced pressure and the oily residue—1-(N-methyl-piperidyl-4′)-3-n-octyl-4-(4″-chloro-phenyl)-5-amino-pyrazole—is crystallized from ethanol-water and then twice recrystallized from the same solvent mixture. The new 5-amino-pyrazole derivative crystallizes with one mol of water of crystallization and melts at 100–102°.

The α-nonanoyl-4-chloro-benzylcyanide (M.P. 41–42°) can be prepared by reacting 4-chloro-benzylcyanide with pelargonic acid ethylester in ethanol in the presence of sodium ethylate.

EXAMPLE 45

A solution of 1.9 parts of N-methyl-piperidyl-4-hydrazine in 3 parts by volume of glacial acetic acid is stirred dropwise into a solution of 3.4 parts of α-acetyl-2,4-dichloro-benzylcyanide in 30 parts by volume of glacial acetic acid, care being taken that the reaction temperature does not exceed 40°. The reaction mixture is then further stirred for two hours at room temperature, after which the glacial acetic acid is distilled off at 40–50° under reduced pressure. The residue is then taken up in 75 parts by volume of water, washed with a total of 50 parts by volume of ether, the aqueous solution rendered alkaline by and saturated with sodium carbonate and then extracted with a total of 250 parts by volume of benzene. After drying the extract over magnesium sulfate, the benzene is evaporated off under reduced pressure, and the residue—1-(N-methyl-piperidyl-4′)-3-methyl-4-(2″,4″-dichloro-phenyl)-5-amino-pyrazole — crystallized from benzene-petroleum ether. After recrystallization from the same solvent mixture, the new 5-amino-pyrazole derivative melts at 116–118°.

The α-acetyl-2,4-dichloro-benzylcyanide (M.P. 131–133°) can be prepared by reacting 2,4-dichloro-benzylcyanide with ethyl acetate in ethanol in the presence of sodium ethylate.

Having thus disclosed the invention, what is claimed is:

1. A member selected from the group consisting of the compounds of the formula

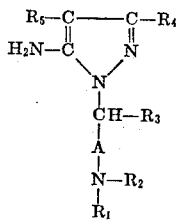

and the non-toxic, pharmaceutically acceptable acid addition salts thereof, wherein each of $R_1$ and $R_2$ independently stands for lower alkyl, A stands for a saturated alkylene bridge with at most two carbon atoms, $R_3$ independently stands for hydrogen, $R_4$ stands for a member selected from the group consisting of hydrogen, alkyl with 1 to 8 carbon atoms, trifluoromethyl, phenyl and benzyl, $R_5$ stands for a member selected from the group consisting of H, lower alkyl, phenyl, tolyl, chlorophenyl, dichlorophenyl, fluorophenyl, methoxyphenyl, carboxy and carbethoxy, and wherein $R_3$ when taken together with $R_2$ stands for an ethylene bridge.

2. A compound of the formula

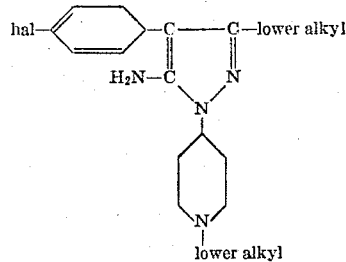

wherein hal is a member selected from the group consisting of chlorine and fluorine, the lower alkyl group in the 3-position of the pyrazole ring contains from 1 to 8 carbon atoms, and the —N-lower alkyl group contains 1 to 3 carbon atoms.

3. 1 - (N - methyl - piperidyl - 4') - 3 - methyl - 4 - phenyl-5-amino-pyrazole.

4. 1 - (N - methyl - piperidyl - 4') - 3 - n - butyl - 4 - (4"-chloro-phenyl)-5-amino-pyrazole.

5. 1 - (N - methyl - piperidyl - 4') - 3 - n - butyl - 4- (4"-chloro-phenyl)-5-amino-pyrazole.

6. 1 - (N - methyl - piperidyl - 4') - 3 - benzyl - 4 - (4"-fluoro-phenyl)-5-amino-pyrazole.

7. 1 - (N - methyl - piperidyl - 4') - 3 - isopropyl - 4 - (4"-chloro-phenyl)-5-amino-pyrazole.

8. 1 - (N - methyl - piperidyl - 4') - 3 - trifluoromethyl - 4-(4"-fluoro-phenyl)-5-amino-pyrazole.

9. 1 - (N - n - butyl - piperidyl - 4') - 3 - trifluoro - methyl-4-phenyl-5-amino-pyrazole.

10. 1 - (N - methyl - piperidyl - 4') - 3- trifluoromethyl - 4-(4"-chloro-phenyl)-5-amino-pyrazole.

References Cited in the file of this patent

Richter's Organic Chemistry (Textbook), 3rd Ed., vol. 4, pages 22–25, 195 and 196 (1947), Elsevier Publishing Co., Inc., New York, N.Y.